United States Patent

Torres

[11] Patent Number: 5,271,623
[45] Date of Patent: Dec. 21, 1993

[54] GAME WITH MATCHING PIECES

[76] Inventor: Alberto J. Torres, 7641 Venetian St., Apt. D, Miramar, Fla. 33023-2517

[21] Appl. No.: 980,051

[22] Filed: Nov. 23, 1992

[51] Int. Cl.⁵ .................. A63F 3/00; G09B 1/30
[52] U.S. Cl. .................... 273/299; 273/272; 273/282.1; 434/172
[58] Field of Search ............ 273/299, 272, 148 A, 273/302, 282.1; 434/167, 171, 172

[56] References Cited

U.S. PATENT DOCUMENTS

| 3,215,435 | 11/1965 | Rheingruber | 434/172 |
| 4,934,711 | 6/1990 | Runstein | 273/272 |

FOREIGN PATENT DOCUMENTS

| 1234784 | 10/1960 | France | 434/172 |
| 1021094 | 2/1966 | United Kingdom | 434/167 |
| 1337981 | 11/1973 | United Kingdom | 273/272 |

Primary Examiner—Benjamin H. Layno
Attorney, Agent, or Firm—J. Sanchelima

[57] ABSTRACT

A game for building words and form concepts form the selection and arrangement of symbols within a given topic. A card with longitudinal slots is adapted to receive one topic chip per slot and one or more symbols that form a word related to each one of those topics. The symbols chips are pre-organized through the use of unique relief patters that are accepted in position with complementary relief patterns in a carrier for these symbol chips. As the players build their words they are called to defend them as being relevant to the topic categories where they were built.

7 Claims, 2 Drawing Sheets

GAME WITH MATCHING PIECES

BACKGROUND OF THE INVENTION

1. Field of the Invention

The present invention relates to a method and apparatus for playing a game with phonemes and letters to construct words and define their meaning.

2. Description of the Related Art

A number of games exist that utilize letters to build words. However, none of these games are based on phonemes or require the user to defend its meaning within a given topic. The use of phonemes permits greater flexibility and speed in the game. The game is flexible enough to permit its adaptation in any language.

SUMMARY OF THE INVENTION

It is one of the main objects of the present invention to provide a game that teaches the players how to combine phonemes and letters in a given language, or under a predetermined set of rules, to construct words and to form concepts.

It is another object of this invention to provide a game that injects knowledge to the users while they play without limit at all.

It is still another object of the present invention, when used as a language teaching tool, to provide a game for practicing the use of vocables to enrich the user's vocabulary.

Another object of the present invention is to bring within the reach of users of any age or cultural level the above mentioned benefits.

It is yet another object of this present invention to provide such a game that utilizes parts that are inexpensive to manufacture and maintain while retaining their effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
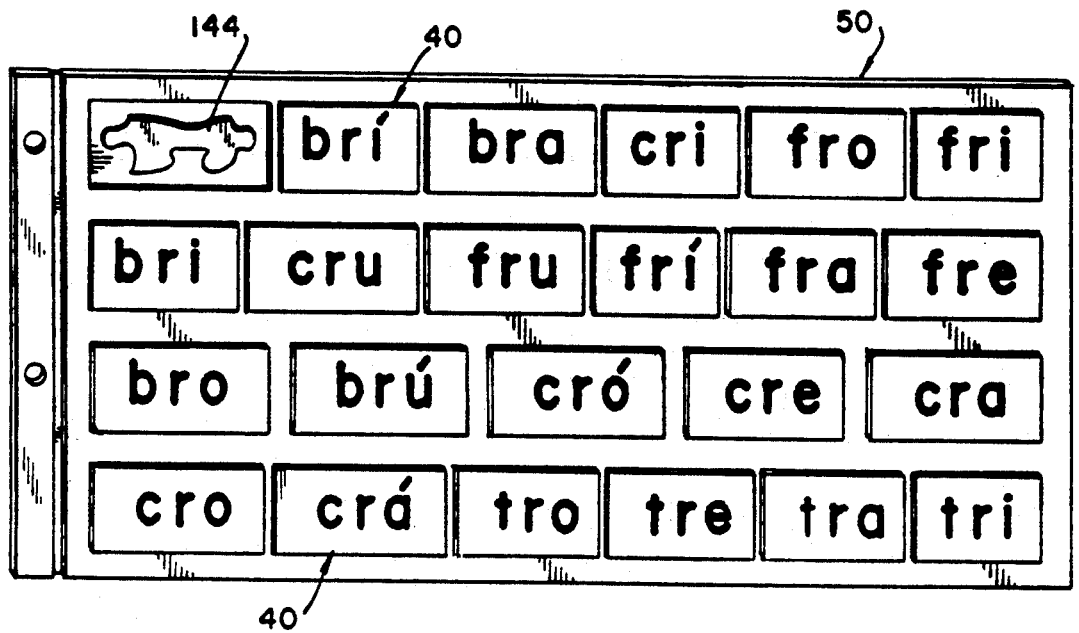
FIG. 1 shows one of the storage carriers for the symbol chips that are preferably arranged in a predetermined order.
Figure 2:
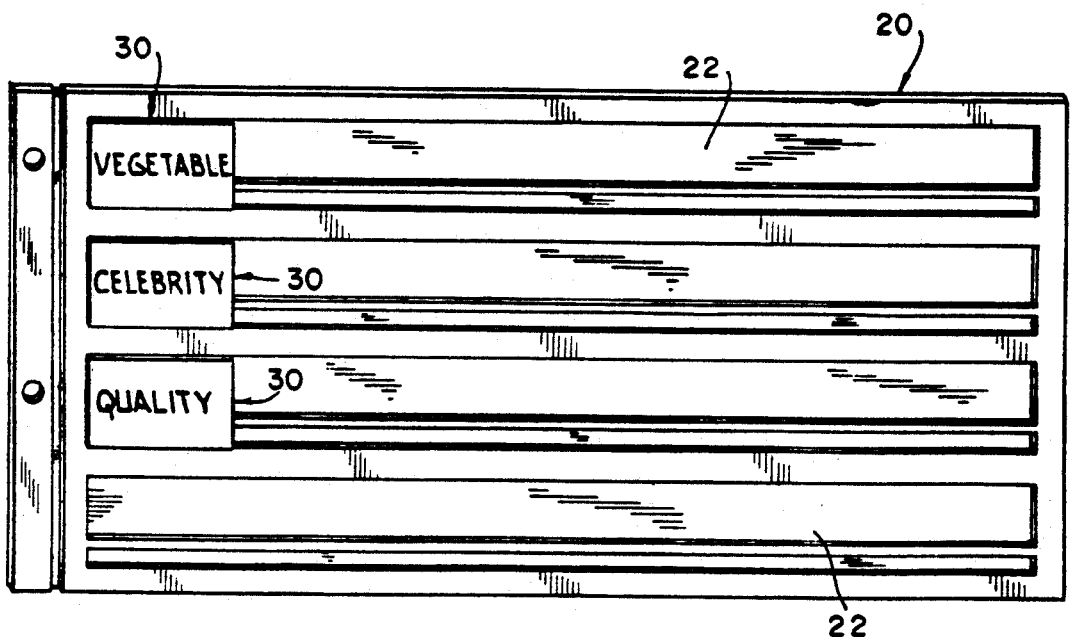
FIG. 2 represents one of the rectangular cards used in the preferred embodiment of the game having longitudinally extending slots where the chips with symbols are slidably positioned.
Figure 3:
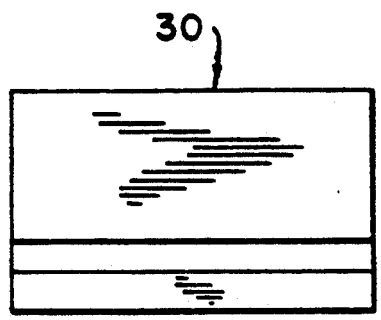
FIGS. 3 and 3A illustrate one of the topic chips used in the game having symbol on one of its faces and the other face having preferably a guide that cooperatively matches with the slots in the rectangular cards.
Figure 4:
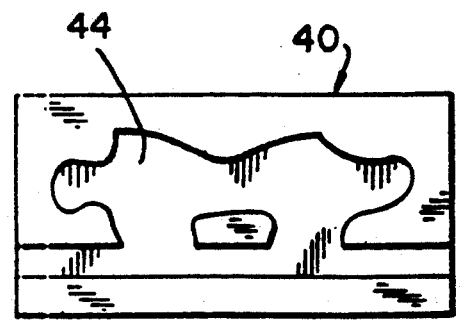
FIGS. 4 and 4A represent one of the symbol chips having a symbol represented on one of its faces and the other face having a relief pattern that cooperatively matches with the recessed patterns of the carriers.
Figure 3A:
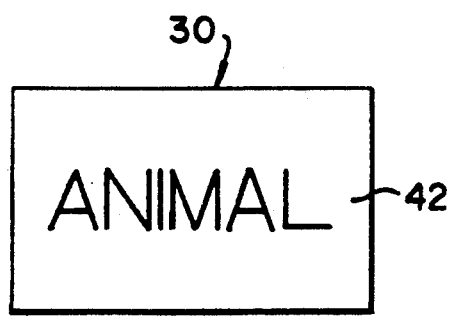
Figure 4A:
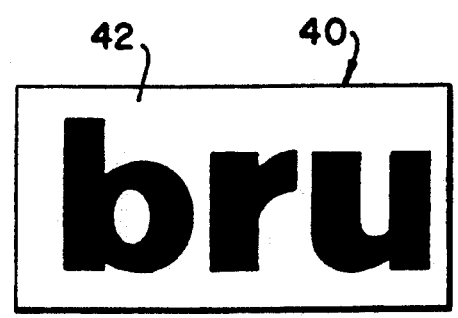

Referring now to the drawings, the present invention includes four rectangular cards 20 having each four longitudinally extending slots 22. Chips 30 and 40 are cooperatively and slidably received within slots 22. Topic chips 30 include a legend on one of its two surfaces that relates to a topic or other general class of things or general concept, and the other surface includes a guide that permits it to be slidably mounted to rectangular card 20. Symbol chip carrier 50 includes a number of recessed areas 144 for receiving symbol chips 40. Symbol chips 40 have two faces or surfaces. Upper surface 42 includes the representation of a symbol (such as a letter or phoneme or other figure that can be logically combine) and underside surface 44 has a relief pattern that mates with a complementary recessed pattern at a particular location in symbol chip carrier 50. In this manner, symbol chips 40 can be organized in a predetermined fashion to facilitate its readily localization by a player and to provide orderly means of storage. Also, this organization can respond to different degrees of difficulty that will permit the users or players to advance without getting frustrated.

To play the game a rectangular card 20 is given to each player. Preferably, there are four players and an arbiter. Each player is given twelve topic chips 30 and the player selects initially four of the twelve chips and slidably mounts each one of them on each one of the slots 22. Then the players decide who goes first and the order in which they are going to play.

The player that goes first selects one symbol chip 40 from carrier 50 and places it in one of the slots 22. The player must have a word in mind, and the word should not be obviously displayed because the other players may retrieve the symbols (phonemes or letters) that are required to complete the word. The second player will then take a chip 40, followed by the third and fourth player. When the turn for the first player comes again, he will try to finish the word he had to mind if the needed phoneme is still available. If a phoneme or letter is taken from carrier 50, the player may still change the intended word for another one, or may intend to construct a word for the other slots. The word formed has to be properly within the topic or otherwise it may be disqualified by the arbiter. It is also possible to negotiate or barter symbol chips 40.

After one of the players completes his four words, no more symbol chips can be taken from carrier 50. Then, each player has to define the meaning of each of his or her words and how they fall within the topics under which that were constructed.

The decision as to whether the words constructed fall within a given topic is within the jurisdiction of the arbiter. In the event there is no arbiter, then the players themselves will have to consult the pertinent references. Each player will receive a predetermined number of points for each work correctly constructed and defined.

The next step is to select another four topics by each of the players, and to proceed with the game in a similar fashion. Finally, the third round is the last one and after the first player completes his four words, the points accumulated are counted to determine who the winner is. If a player cannot support the meaning of a word constructed within a given topic then he or she will lose points accordingly.

One of the applications for this game is to use it to teach a language such as Spanish, for instance. In the application, the phonemes and letters are ordered in five groups, in the preferred embodiment. The first group includes phonemes that have a consonant followed by a vowel, such as:

| Series | Sub-Group No. 1 | | | | |
|---|---|---|---|---|---|
| 1 | ma | me | mi | mo | mu |
| 2 | pe | po | pa | pu | pi |
| 3 | la | le | li | lo | lu |
| 4 | sa | se | si | so | su |
| 5 | ta | te | ti | to | tu |
| 6 | ne | ni | no | nu | na |
| | Sub-Group No. 2 | | | | |
| 7 | da | de | di | do | du |
| 8 | ca | co | cu | que | qui |
| 9 | ba | bi | bo | be | bu |
| 10 | va | ve | vi | vo | vu |
| 11 | rra | rre | rri | rro | rru |
| 12 | ra | re | ri | ro | ru (rr) |
| | Sub-Group No. 3 | | | | | |
| 13 | ra | re | ri | ro | ru (r) | |
| 14 | fo | fa | fe | fu | fi | |
| 15 | jo | ju | ji | ja | je | gi | ge |
| 16 | ga | go | gu | gue | gui | |
| 17 | no | ne | ni | na | nu | |
| 18 | cho | chi | cha | chu | che | |
| | Sub-Group No. 4 | | | | | |
| 19 | lla | llo | llu | lle | lli | |
| 20 | ya | yu | yo | ye | yi | |
| 21 | zo | ze | zi | zu | za | ci | ce |
| 22 | ha | hi | ho | hu | he | |
| 23 | ki | ka | ko | ke | ku | |

The second group is characterized by having two consonants followed by a vowel.

| Series | Sub-Group No. 5 | | | | |
|---|---|---|---|---|---|
| 24 | pla | ple | pli | plo | plu |
| 25 | blo | bla | ble | bli | blu |
| 26 | cla | cle | cli | clo | clu |
| 27 | flo | fli | fla | fle | flu |
| 28 | glo | gle | gli | gla | glu |
| | Sub-Group No. 6 | | | | |
| 29 | pre | pro | pra | pri | pru |
| 30 | bra | bre | bri | bro | bru |
| 31 | cre | cri | cro | cra | cru |
| 32 | fre | fri | fro | fru | fra |
| 33 | tro | tru | tra | tre | tri |
| 34 | gri | gro | gra | gre | gru |

| Series | | | | | |
|---|---|---|---|---|---|
| 35 | dra | dre | dri | dro | dru |

The third group has a vowel followed by one consonant.

| Series | Sub-Group No. 7 | | | | |
|---|---|---|---|---|---|
| 36 | al | ul | ol | el | il |
| 37 | in | on | en | an | un |
| 38 | as | es | is | os | us |
| 39 | oz | uz | az | iz | ez |
| 40 | er | ir | or | ur | ar |
| | Sub-Group No. 8 | | | | |
| 41 | am | em | im | om | um |
| 42 | ec | oc | ic | ac | uc |
| 43 | ax | ex | ix | ox | ux |
| 44 | id | ed | ad | ud | od |

The fourth group is composed of phonemes that include two vowel.

| Series | Sub-Group No. 7 | | | |
|---|---|---|---|---|
| 45 | ia | io | ie | iu |
| 46 | ue | ua | ui | uo |
| 47 | au | eu | | |
| | Sub-Group No. 8 | | | |
| 48 | ai | ei | oi | |
| 49 | ae | ao | | |
| 50 | ea | eo | | |
| 51 | ay | uy | oy | ey |

The fifth group includes the letters of the alphabet, preferably the letters are placed in alphabetical order in symbol chip carrier 50. It should be noted that the groups have been formed taking in to consideration the difficulty or simplicity of its pronunciation in Spanish language. The number of repeated phonemes and letters will vary depending on the frequency with which the phonemes or letter are used in the language. At least there will be one phoneme and one letter of each of the ones included the foregoing five groups.

| Carrier Number 1 | | | | | | | | | | |
|---|---|---|---|---|---|---|---|---|---|---|
| a | e | o | u | i | ú | á | me | M | mi | m | mo |
| mi | mu | ma | mé | mú | m | mis | mó | ma | | |
| mi | má | más | po | pa | pe | pi | pu | | | |
| pá | pi | P | p | pú | A | E | I | O | U | |
| Carrier Number 2 | | | | | | | | | | |
| le | lo | l | la | li | L | los | li | las | le | |
| lu | ló | lá | lí | l | la | si | se | sa | s | |
| su | so | S | sá | s | su | T | ti | ta | t | |
| te | tu | to | tá | tú | tí | nu | no | n | | |
| Carrier Number 3 | | | | | | | | | | |
| na | ni | ne | nó | ni | ná | nú | uno | N | | |
| do | di | da | du | de | d | D | cu | qui | | |
| co | qui | ca | que | q | Q | co | cá | có | | |
| que | x | X | bi | be | bu | ba | bo | bú | | |
| Carrier Number 4 | | | | | | | | | | |
| B | b | vi | ve | va | vu | vo | v | V | | |
| rru | rre | rri | rro | rra | ra | ri | | rr | | |
| ro | ru | re | rá | rí | ra | r | ro | R | | |
| fe | fi | fu | fa | fo | fé | fá | f | F | G | |
| Carrier Number 5 | | | | | | | | | | |
| gi | ge | ji | je | jo | ju | ja | J | jí | j | |
| go | gui | gue | gu | ga | G | ñi | ñu | | | |
| ña | ñe | ño | N | ñ | chi | cho | che | | | |
| ch | cha | chu | cho | CH | llu | ella | | | | |

-continued

| Carrier Number 6 | | | | | | | | | | |
|---|---|---|---|---|---|---|---|---|---|---|
| lla | lle | llo | lli | ll | Ll | Y | yi | | | |
| Yo | yu | yo | y | ye | yo | ya | z | ze | | |
| za | zi | zu | zo | Z | zó | ci | ce | c | | |
| cí | cé | C | hi | he | h | hu | ho | hí | | |
| Carrier Number 7 | | | | | | | | | | |
| H | hú | ha | ko | ku | ki | ke | k | K | | |
| ka | a | A | b | B | c | C | ch | CH | d | D |
| e | E | f | F | g | G | h | H | i | I | j | J |
| k | K | l | L | ll | Ll | m | M | n | N | ñ | N |
| Carrier Number 8 | | | | | | | | | | |
| o | O | p | P | Q | r | R | rr | s | S | |
| t | T | u | U | v | V | w | W | x | X | y | Y |
| z | Z | pla | ple | plu | plo | pli | | | | |
| plá | bla | blu | blo | bli | ble | | | | | |
| Carrier Number 9 | | | | | | | | | | |
| cle | clu | clo | cla | cli | flo | | | | | |
| flu | fla | fle | fli | gla | glo | | | | | |
| glu | gli | gle | glú | pri | pru | | | | | |
| pra | pre | pro | bre | bru | bri | | | | | |
| Carrier Number 10 | | | | | | | | | | |
| bra | bro | brí | brú | cri | cru | | | | | |
| cre | cró | cra | cro | crá | fro | | | | | |
| fri | fru | fra | fre | frí | tro | | | | | |
| tre | tra | tri | tru | tró | tré | | | | | |
| Carrier Number 11 | | | | | | | | | | |
| gre | gro | gra | gru | gri | dra | | | | | |
| dro | dru | dre | dri | a | b | c | ch | | | |
| d | e | f | g | h | i | j | k | l | ll | m | n | o |
| p | q | r | rr | s | t | u | v | w | x | y | z |
| Carrier Number 12 | | | | | | | | | | |
| el | il | ul | él | ol | el | úl | El | al | | |
| él | un | en | sin | an | in | un | on | án | | |
| ún | én | ón | ín | os | es | as | nos | us | | |
| is | es | ís | ás | ús | az | oz | uz | iz | | |
| Carrier Number 13 | | | | | | | | | | |
| ex | iz | ar | er | por | ir | or | ur | ér | | |
| á r | am | om | um | im | em | óm | ám | ém | | |
| ic | ec | oc | ac | uc | ex | ax | ix | ox | | |
| ux | ud | od | ad | ed | id | ie | io | ia | | |
| Carrier Number 14 | | | | | | | | | | |
| iu | ía | íe | ío | ua | uo | ue | úa | ui | | |
| eu | au | ou | aú | éu | oe | oa | oi | ei | | |
| ai | ao | ae | ea | eo | uy | ey | ay | oy | | |
| ob | ab | ub | ! | ?! | ? | !, | .. | | | |

As it can be seen, the phonemes in Spanish follow a predetermined order that responds to its complexity in pronunciation. This is specially useful with children, including those with disabilities, so that increasingly complex words can be formed with the combination of the phonemes. In addition, the player or user has to defend the meaning of the word resulting from the combination of words and that if falls within the topic slot where it was formed.

The game apparatus described herein can also be implemented with computerized video technology wherein icons of different shapes can be created to perform substantially the same functions of the components we have described here.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A game for learning a language comprising:
   a. two or more cards each card having a first plurality of longitudinally extending slots;
   b. a second plurality of topic chips each having two surfaces, one of the surfaces including a legend signifying a topic and said topic chips being cooperatively and slidably receivable within said slots;
   c. a third plurality of symbol chips each having two surfaces, one of the surfaces including a symbol and the other surface including a unique relief pattern and said symbol chips being cooperatively and slidably receivable within said slots wherein each slot is adapted to slidably receive a topic chip and a plurality of symbol chips at any one time; and
   d. carrier means for holding and displaying said symbol chips and further including a plurality of complementary unique relief patterns corresponding to said unique relief patterns of said symbol chips for cooperatively receiving said symbol chips.

2. The game set forth in claim 1 wherein said symbol chips are mounted on said carrier means in a predetermined order.

3. The game set forth in claim 1 wherein the symbol on each of said symbol chips corresponds to a phoneme in a language.

4. The game set forth in claim 2 wherein the phonemes correspond to those of the Spanish language.

5. A method for learning a language through the playing of a game with at least two players comprising the steps of:

a. providing at least one rectangular card to each of said players and said cards including a first plurality of longitudinally extending slots;
b. designating a topic for each one of said slots;
c. providing a second plurality of topic chips each having two surfaces, one of said surfaces including a legend signifying a topic and said topic chips being cooperatively and slidably receivable within said slots;
d. providing a third plurality of symbol chips each having two surfaces, one of the surfaces including a symbol and the other surface including a unique relief pattern and said symbol chips being cooperatively and slidably receivable within said slots;
e. providing carrier means for holding and displaying said symbol chips and further including complementary relief means for cooperatively receiving said symbol chips;
f. ordering said symbol chips in said carrier means in a predetermined order depending on the complexity of the pronunciation of the symbol;
g. each player taking turns in selecting a first plurality said topic chips and slidably placing one topic chip on each one of said slots;
h. each player taking turns in selecting one symbol chip at the time and placing said symbol chips slidably on each one of said slots so that meaningful combinations of said symbols are formed on said slots corresponding to said topic chips on said slots; and
i. winning the game when one of said players forms meaningful combinations to each one of said slots.

6. The method set forth in claim 5 wherein said symbols correspond to phonemes in a language.

7. The method set forth in claim 6 wherein said phonemes correspond to those of the Spanish language.

* * * * *